United States Patent

Huddleston

[15] 3,638,160

[45] Jan. 25, 1972

[54] SHOCK PRESSURE TRANSDUCER

[72] Inventor: Roy L. Huddleston, Concord, Tenn.

[73] Assignee: The United States of America as represented by the United States Atomic Energy Commission

[22] Filed: Sept. 4, 1969

[21] Appl. No.: 855,248

[52] U.S. Cl. .................................... 338/36, 338/2, 338/4, 73/35
[51] Int. Cl. ........................................... H01c 7/00
[58] Field of Search .................... 338/36, 47, 2, 4, 5, 6; 73/35

[56] References Cited

UNITED STATES PATENTS 3,341,797  9/1967  Watson .................................. 338/47
3,089,341  5/1963  Gay ...................................... 338/36 X Primary Examiner—Rodney D. Bennett
Assistant Examiner—R. Kinberg
Attorney—Roland A. Anderson

[57] ABSTRACT

An improved shock pressure transducer has been provided wherein the improvement consists of a low-resistance connection between a thin vapor-deposited sensor grid and the electrical pins of an encapsulated transducer. The connection in combination with other known parts produces a significant increase in the output of the transducer.

4 Claims, 3 Drawing Figures

PATENTED JAN 25 1972

3,638,160

INVENTOR.
Roy L. Huddleston

BY

ATTORNEY.

3,638,160

SHOCK PRESSURE TRANSDUCER

BACKGROUND OF THE INVENTION

The present invention was made during the course of, or under, a contract with the U.S. Atomic Energy Commission.

The present invention relates generally to shock pressure transducers and more specifically to an improved shock pressure transducer with increased sensitivity and reliability.

In the art of shock pressure transducer design, it is known that certain materials undergo a significant change in resistance upon the application of pressure. Pressure-sensing elements of sodium, strontium, lithium, and calcium have resistivity-pressure characteristics which are adaptable in high-output pressure measurement devices for 0 to 100 kilobars and possibly higher. In the art of transducers of this nature is included a low-inductance, resistive element or grid of one of these elements usually encapsulated in a nonconductive housing. The grid is connected to external circuits by means of electrical pins connected to the grid. For low output the transducer may be excited with a constant current while the voltage drop across the grid is monitored during the time interval it is exposed to pressure. The output of the transducer can be increased by pulsing the grid with a square wave current pulse, during the time interval over which the pressure change is to be monitored.

It has been found, however, that the capability of this type of transducer has been severely limited by the electrical connection between the electrode pins and the sensing grid. The resistance of this connection limits the pulsing current to a few amperes in these transducers.

In nuclear test shots, shock pressure monitoring where the output signal must be transmitted long distances before recording, the signal becomes so small that it is difficult, if not impossible, to properly measure. Thus, the limited pulsing current which, in turn, limits the output signal level makes these transducers, which are otherwise ideal for nuclear shock pressure measurements, impractical. Realizing this problem, applicant has provided an improved shock pressure transducer which can be pulsed with currents as high as 100 amperes or higher and has greatly improved the sensitivity and reliability of these transducers.

SUMMARY OF THE INVENTION

It is one object of this invention to provide an improved shock pressure transducer which has greatly increased sensitivity over like prior art transducers.

It is another object of this invention to provide an improved shock pressure transducer with increased reliability at significantly increased current operating levels.

Briefly, the above objects are attained in the discovery that a lithium connection between the electrode pins and the pressure-sensing grid together with a thin vapor-deposited grid structure allows the transducer to be pulsed at greatly increased current levels without destroying the transducer. This increase in current pulsing, in turn, increases the output signal to a level which can be easily detected at extended distances from the test position. The thinner grid structure obtained by vapor deposition provides a higher purity sensing material, as well as a sharper pressure resolution.

Other objects and many of the attendant advantages of the present invention will be evident from the following detailed description when taken in conjunction with the accompanying drawings.

DETAILED DESCRIPTION

Figure 3:
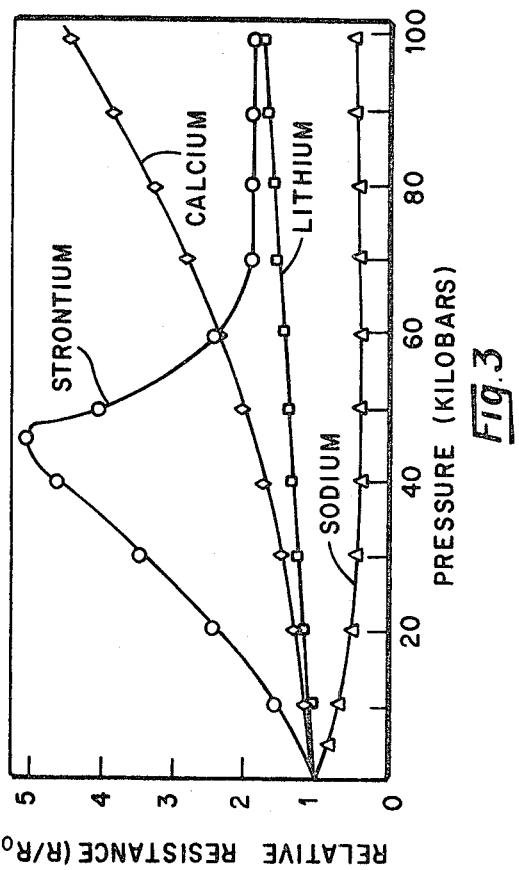
FIG. 3 is a graph of the room temperature relative resistance of strontium, calcium, lithium, and sodium as a function of pressure.

Referring to the figures, the improved shock pressure transducer, as shown, consists of an electrically insulating base member 5 preferably made of high-density aluminum oxide upon which is vapor deposited a thin pressure-sensing grid 7. The grid 7 may be made of sodium, strontium, lithium, calcium, or other elements which undergo significant resistivity changes when subjected to pressure. Each of the metals listed have resistivity-pressure characteristics which are adaptable to high-output pressure measurement devices for pressure ranges up to 100 kilobars and possibly higher, as shown graphically in FIG. 3. A particular grid metal is selected for the best results at the particular range of shock pressures to be measured. For example, as shown in FIG. 3, strontium provides a large resistivity change of 5 ($R/R_o$) in going up to 46 kilobars after which it falls off; both lithium and calcium provide lower but continuous increases in resistivity with pressure up to the 100-kilobar level, and sodium provides a decrease in resistance in going to 30 to 40 kilobars after which it levels off.

Since these metals, which have been found to be most desirable for pressure measurement, are very reactive the transducers must be fabricated in an inert atmosphere. Therefore, the fabrication is preferably carried out in a high-purity argon environment except for the vacuum deposition of the grid 7 onto base 5.

Figure 1:
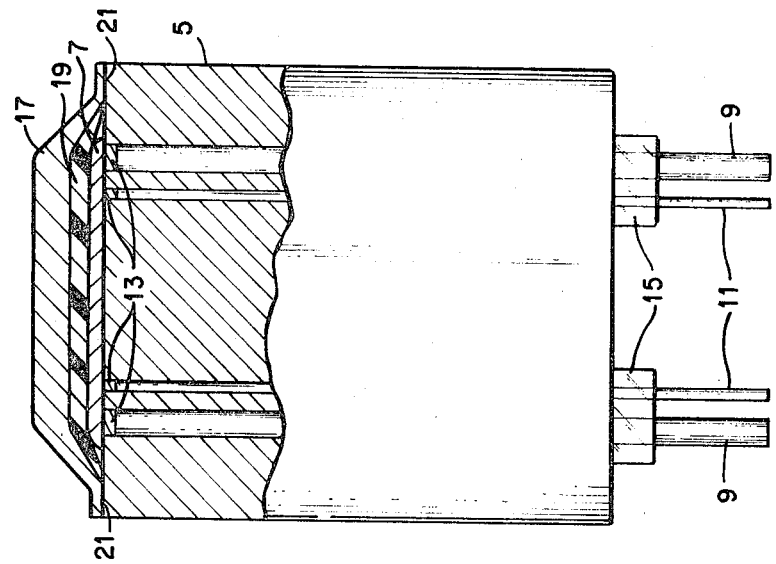
FIG. 1 is a pictorial view partially in section of an improved shock pressure transducer according to the present invention.

Prior to the deposition of the grid 7 electrical connector pins, preferably made from copper, but may be made from other conduction materials, are positioned in appropriate apertures in the base 5. As shown in FIG. 1, a pair of one-eighth inch diameter pins 9 for transmitting the pulsing current to the pressure-sensing grid 7 and a pair of one-tenth inch diameter pins 11 for monitoring the voltage change across the pressure-sensing grid 7 are connected to grid 7 by means of a lithium electrical connection 13.

Figure 2:
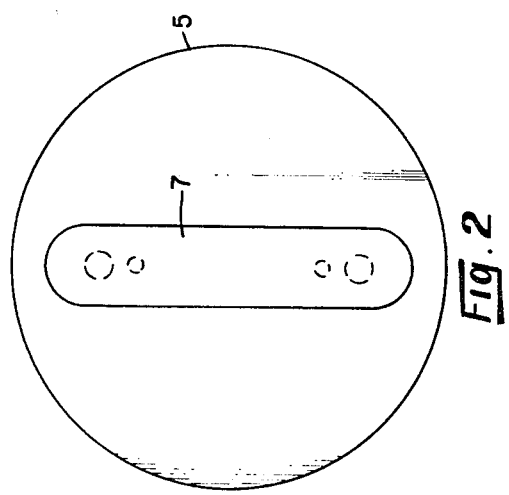
FIG. 2 is an end view of the transducer of FIG. 1 showing the vapor-deposited sensing grid.

The lithium electrical connection 13 is made by wetting the pin tips with lithium metal. This is done by heating the pins to approximately 300° C. and allowing the lithium to wet it like soft solder wets a copper wire. Then the lithium metal is smeared over the pin-base interface before the grid is vapor deposited onto the base. Smearing operations are greatly simplified if the surface finish of the base 5 is a satin or sandblast finish as opposed to a smooth or glaze finish. The pins 9, 11 are held in place and sealed to the base 5 with urethane adhesive 15. After the pins are in place and the smearing operation completed, the pressure-sensing grid 7 is vapor deposited by means of conventional vapor deposition techniques so as to bridge the gap between the pins 9, 11 as shown in FIG. 2. A nominal resistance of the grid 7 is 50 milliohms. The pressure-sensing grid 7 is electrically insulated from a 2-mil thick aluminum foil diffusion barrier 17 by means of a thin layer (approximately one-half mil) of chemically inert insulating material 19 such as "Mylar" (polyethylene terephthalate resin). Encapsulation of the grid is completed by bonding the aluminum barrier 17 to the base 5 with urethane adhesive at 21. The diffusion barrier 17 prevents atmospheric exposure of the grid by preventing diffusion of corrosive atmospheric gases and moisture into the grid.

The lithium metal connection can be characterized by the effects of its distinct physical behavior. (1) Lithium provides a low-resistance conduction of current between the pins and the grid. This practically eliminates one source for heat energy release in prior art sensors which caused undesirable electrical noise and, for sufficiently high currents, expanded or burned out the joint, thus destroying the transducer. (2) Lithium wets the surface of the pins and grid. This increases the electrical bond between the lithium connection, pins and grid. This practically eliminates another source of heat energy release in a usually troublesome area which also caused undesirable electrical noise and expansion of the joint. (3) Lithium forms an eutectic joint between the pins and grid. This permits repair of a connection if failure occurs while the transducer grid is still encapsulated without affecting the chemical and physical properties of the transducer.

Further, it has been found that rapid vapor deposition of the grid provides a high-purity and very thin and sensitive-pressure grid. In prior transducers a 7-mil deep groove-type grid was used in contrast to the present approximated one-half mil thick vapor-deposited grid shown in FIG. 2 with the barrier removed. By rapid vapor deposition of the grid there are fewer impurities in the metal and the resistance can be controlled more closely by measurement during deposition which greatly improves resolution of the transducers.

The prior art transducers were only capable of withstanding current pulses over extended periods of 2 to 3 amperes while the present improved transducer can be pulsed at currents of 100 amperes, thereby greatly increasing the signal output which can be easily transmitted over great distances for detection and measurement.

In operation, the transducer is placed at a point where shock pressure measurements are to be made, such as a nuclear test shot site, certain blasting operations, firearms testing, etc., and a current supply (not shown) is connected between the electrodes 9. The current supply is preferably a pulsating current of approximately 100 amperes. The change in resistance of the grid between the electrodes 11 is then monitored during exposure of the pressure similar to a conventional strain gauge. This can be easily accomplished by recording the voltage across electrodes 11 during a test.

Obviously, many modifications may be made within the teachings as set forth above and claimed hereinafter. For example, the base material is not restricted to aluminum oxide but may be made from other insulating materials such as glass, fused quartz, polymide plastic, and epoxy. The electrode pins may be made from magnesium and other metals as well as copper. The important combination of base and pin material is that there be a close acoustic (shock) impedance match between the two materials so as to prevent internal shock reflections or differential particle velocities from occurring within the transducer and thus shearing the grid, producing pseudo-outputs, or otherwise destroying the transducer.

What is claimed is:

1. In a shock pressure transducer including a pressure-sensing element composed of a material which undergoes a significant change in resistance upon the application of pressure, at least a pair of electrical connecting electrodes coupled to said pressure-sensing element at spaced-apart positions, the improvement comprising:

a base member composed of an electrical insulating material for holding said electrodes;

a metal layer vapor deposited onto said base forming said pressure-sensing element; and a layer of lithium metal connecting each of said electrodes and said sensing element thereby increasing the electrical bond and providing a very low resistance connection between said electrode and said sensing element.

2. A shock pressure transducer as set forth in claim 1 wherein said sensing element is selected from the group of metals consisting of strontium, sodium, lithium, or calcium.

3. A shock pressure transducer as set forth in claim 1 wherein said sensing element is covered with an atmospheric diffusion barrier electrically insulated from said sensing element.

4. A shock pressure transducer as set forth in claim 3 wherein said diffusion barrier comprises a layer of aluminum foil extending over the sensing element and bonded to said base member, thereby encapsulating said sensing element and preventing atmospheric exposure of said element.

* * * * *